United States Patent [19]

Endo et al.

[11] Patent Number: 4,896,249
[45] Date of Patent: Jan. 23, 1990

[54] ELECTRIC DOUBLE LAYER CAPACITOR

[75] Inventors: Masanori Endo; Kouichi Watanabe, both of Kyoto, Japan

[73] Assignee: Murata Manufacturing Co., Ltd., Japan

[21] Appl. No.: 308,307

[22] Filed: Feb. 8, 1989

[30] Foreign Application Priority Data

Feb. 9, 1988 [JP] Japan .................................. 63-028126

[51] Int. Cl.$^4$ .............................................. H01G 9/00
[52] U.S. Cl. .................................................... 361/502
[58] Field of Search ....................... 361/502; 264/29.2; 423/447.1; 502/9, 180

[56] References Cited

U.S. PATENT DOCUMENTS

| | | | |
|---|---|---|---|
| 4,394,713 | 7/1983 | Yoshida | 361/502 |
| 4,542,444 | 9/1985 | Boland | 361/502 |
| 4,626,964 | 12/1986 | Azuma et al. | 361/502 |
| 4,814,157 | 3/1989 | Uno et al. | 423/447.1 |

Primary Examiner—Donald A. Griffin
Attorney, Agent, or Firm—Ostrolenk, Faber, Gerb & Soffen

[57] ABSTRACT

An electric double layer capacitor utilizing an electric double layer which is formed at the interface between activated carbon electrodes and electrolyte included in polarizable electrodes, wherein the activated carbon electrodes are formed of polyacrylonitrile based activated carbon whose nitrogen content is not more than 7 wt %.

4 Claims, 1 Drawing Sheet

ELECTRIC DOUBLE LAYER CAPACITOR

BACKGROUND OF THE INVENTION

1. Filed of the Invention

The present invention relates to improvements in an electric double layer capacitor, particularly in activated carbon which forms activated carbon electrodes included in polarizable electrodes.

2. Description of the Background Art

Generally, an electric double layer capacitor has an electric double layer formed at the surface of separation or interface between activated carbon electrodes and electrolyte included in polarizable electrodes, and electric charge is stored in said electric double layer. The activated carbon used for activated carbon electrodes is produced by carbonizing and activating vegetable materials (wood, wood flour, coconut shell, lining, pulp waste water, etc.), mineral materials (coal, coke, pitch, etc.) or synthetic resins (phenol, polyacrylonitrile, cellulose, vinyl chloride, etc.).

In conventional electric double layer capacitors, there exist on the surface of the activated carbon such oxygen functional groups as carboxyl group, carbonyl group and phenolic hydroxy group. If these functional groups exist in large quantities, the affinity of the activated carbon electrodes for the electrolyte improves and the area of the interface between the activated carbon electrodes and the electrolyte increases, so that the electrostatic capacity is increased and stabilized.

However, these functional groups decompose when an electrical potential is imposed on the electrode; therefore, if they exist in large quantities, they deteriorate the voltage retaining characteristic of the capacitor. Therefore, the idea of increasing the electrostatic capacity by increasing oxygen functional groups could not be adopted where the general characteristics of an electric double layer capacitor must be taken into consideration.

SUMMARY OF THE INVENTION

An object of the present invention is to provide an electric double layer capacitor wherein the surface utilization rate of activated carbon is improved so that the electrostatic capacity is increased and stabilized and the voltage retaining characteristic is superior.

The present invention is directed to an electric double layer capacitor utilizing an electric double layer which is formed at the interface between activated carbon electrodes and electrolyte included in polarizable electrodes, the invention being characterized in that the activated carbon electrodes are made of polyacrylonitrile based activated carbon whose nitrogen content is not more than 7 wt %.

Polyacrylonitrile based activated carbon has a nitrogen functional group. Nitrogen functional group has a greater dipole moment than that of oxygen functional group; therefore, if polyacrylonitrile based activated carbon is used for activated carbon electrodes, their affinity for the electrolyte improves, so that the electrostatic capacity is increased and stabilized.

On the other hand, nitrogen functional group will decompose if it has an electrical potential imposed thereon; therefore, if there is too much nitrogen functional group, the voltage retaining characteristic of the electric double layer capacitor deteriorates. In an electric double layer capacitor according to the present invention, since polyacrylonitrile based activated carbon whose nitrogen content is not more than 7 wt % is used, the amount of nitrogen functional group is proper and superior voltage retaining characteristic is developed.

In addition, polyacrylonitrile to provide polyacrylonitrile based activated carbon is used in the form of powder, fiber, non-woven fabric or woven fabric; preferably, it is in the form of fiber. The reason is that this makes it easier for pyrolyzed gas and activating gas involved in converting polyacrylonitrile into activated carbon to diffuse.

DESCRIPTION OF THE PREFERRED EMBODIMENTS

Figure 1:
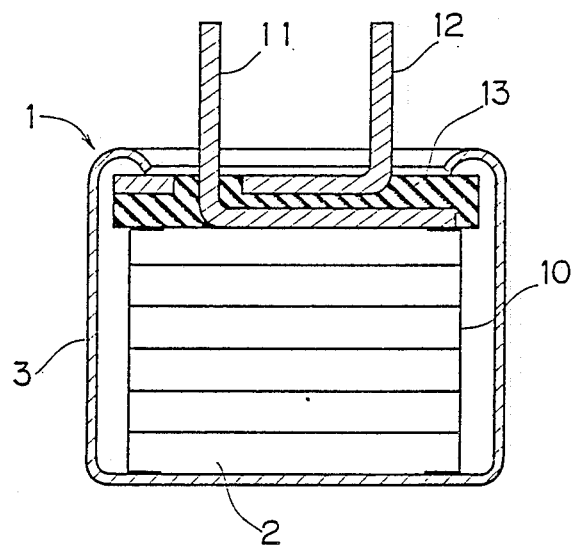
FIG. 1 is a longitudinal sectional view of an electric double layer capacitor.
Figure 2:
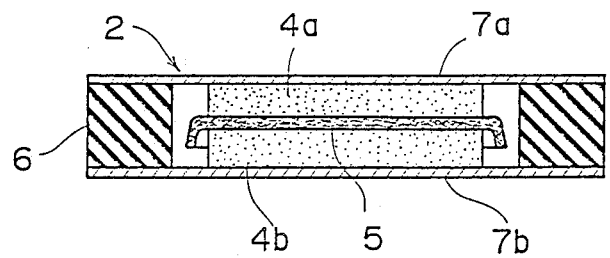
FIG. 2 is a capacitor cell included in the electric double layer capacitor shown in FIG. 1.

In FIG. 1, the six disk-like capacitor cells 2 of an electric double layer capacitor 1 are concentrically stacked and housed in a cup-ike case 3. As shown in FIG. 2, each cell 2 comprises a pair of polarizable electrodes 4a and 4b, a separator 5, an annular gasket 6, and a pair of current collectors 7a and 7b thermally bonded to the upper and lower surfaces of the gasket 6.

The polarizable electrodes 4a and 4b are disposed in the center of the space defined by the gasket 6 and are separated from each other by the separator 5. The polarizable electrodes 4a and 4b are provided with activated carbon electrodes produced by subjecting a synthetic resin to flame resisting treatment and activating treatment. The separator 5 is produced of a porous film or non-woven fabric of polyolefin and is preferably formed with a raised portion around its peripheral edge. This raised portion surrounds one polarizable electrode 4b, thereby preventing the polarizable electrodes 4a and 4b from peripherally short-circuiting each other. The separator 5 and the activated carbon electrodes of polarizable electrodes 4a and 4b are impregnated with an electrolyte, such as a 50 wt % aqueous solution of sulfuric acid.

The cells 2 constructed in the manner described above are stacked as shown in FIG. 1 and combined together from the periphery by a thermally shrinkable insulating tube 10 and then received in the case 3 in pressurized condition. In addition, the numerals 11 and 12 denote metal plates integrally formed with projecting terminals and combined together through an insulating plate 13. The metal plate 11 is electrically connected to the upper end surface of the uppermost cell 2. The metal plate 12 abuts against the case 3 and is electrically connected to the lowermost cell 2 through the case 3.

The polarizable electrodes 4a and 4b housed in each of said cells 2 will now be described. Each of the polarizable electrodes 4a and 4b is provided with an activated carbon electrode formed of polyacrylonitrile based activated carbon whose nitrogen content is not more than 7 wt %. The polyacrylonitrile used as the material has its about 26 wt % nitrogen removed as $NH_3$, HCN and $N_2$ during the carbonization and activation process; of such nitrogen, about 15 wt % is left in the form of the following functional groups:

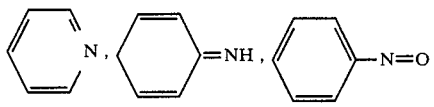

Nitrogen functional group has a greater dipole moment than that of oxygen functional group; therefore, if activated carbon made from polyacrylonitrile is used for activated carbon electrodes, the affinity for the electrolyte will improve as compared with the case where activated carbon made from vegetable materials, mineral materials or phenol or cellulose based synthetic resin is used, and it is possible to expect that the electrostatic capacity is increased. That is, if the nitrogen content of activated carbon is increased, the electrostatic capacity tends to increase. However, since nitrogen functional group decomposes when an electrical potential is imposed thereon, the voltage retaining characteristic of the electric double layer capacitor deteriorates if there is too much nitrogen functional group. Therefore, in the present invention, the nitrogen functional group of activated carbon is controlled at a suitable value by setting the nitrogen content at not more than 7 wt %.

More concrete experimental example will now be described.

EXPERIMENTAL EXAMPLE 1

Polyacrylonitrile based fiber was subjected to flame resisting treatment by heat-treating it in the air at 200°–400° as carbonized at 600°–800° C. and then activated in a mixed gas of water vapor and nitrogen. The activated carbon fiber thus obtained was heat-treated in a vacuum at 1000° C. and then pulverized. Embodiments 1 and 2 shown in Table 1 have different periods of time for this heat treatment in a vacuum. 80 parts by weight of activated carbon which had passed through a 200-mesh screen was dispersed in water, and 20 parts by weight of artificial latex made from chlorosulfonated polyethylene was added thereto, followed by sufficient stirring for mixing. The moisture was then removed from the mixed solution to provide a coagulated mixture. This mixture was crushed and granulated, the granules being pressed by a press machine to provide compacts. The compacts were in the form of disks, measuring 4.7 mm in diameter and 0.3 mm in thickness, the compressive pressure being 0.5–1.5 tons. The compacts obtained were impregnated with an aqueous solution of sulfuric acid (50 wt %) to provide polarizable electrodes.

The polarizable electrodes obtained were employed for an electric double layer capacitor 1 shown in FIGS. 1 and 2. In addition, in this case, the separator 5 was made of porous polypropylene, while the gasket 6 was of rubber type. Further, as for the current collectors 7, a polyethylene film containing carbon black was used.

The characteristics of the electric double layer capacitor are shown in Table 1.

As a comparative example 1, the characteristics of an electric double layer capacitor obtained in the same manner except that the step of heat-treating the activated carbon fiber in a vacuum at 1000° C. was not performed are also shown in Table 1. Further, pulverized activated carbon made from wood flour charcoal and pulverized activated carbon in the form of powder made from phenol based fiber were used to produce electric double layer capacitors in the same manner as above, their characteristics being also shown in Table 1 as conventional examples 1 and 2. In addition, the wood flour charcoal based activated carbon was produced by carbonizing wood powder at 600°–800° C. and activating it in a mixed gas of water vapor and nitrogen at 700°–1000° C. The phenol based activated carbon was produced by carbonizing phenol fiber at 600°–800° C. and activating it at 700°–1000° C. in a mixed gas of water vapor and nitrogen.

TABLE 1

| | Heat treatment | Specific surface area (m²/g) | Nitrogen content (%) | Electrostatic capacity (mF) | Voltage retaining characteristic (V) |
|---|---|---|---|---|---|
| Embodiment 1 | Yes | 690 | 7 | 53 | 3.8 |
| Embodiment 2 | Yes | 670 | 2 | 51 | 4.0 |
| Comparative Example 1 | No | 700 | 10 | 55 | 3.0 |
| Conventional Example 1 (raw ash type) | No | 1000 | 0 | 35 | 3.7 |
| Conventional Example 2 (phenol type) | No | 1300 | 0 | 45 | 3.8 |

It is seen from Table 1 that the electrostatic capacities of the electric double layer capacitors (embodiments 1 and 2 and comparative example 1) having activated carbon electrodes made of activated carbon from polyacrylonitrile are 1.2–1.6 times as high as those of the conventional examples 1 and 2 2. Further, it is seen from a comparison between the embodiments 1, 2 and the comparative example 1 in Table 1 that when the nitrogen content of activated carbon is not more than 7 wt %, the voltage retaining characteristic is improved. On the other hand, it is seen from a comparison between the embodiments 1, 2 and the comparative example 1 that electrostatic capacity is more or less decreased if the nitrogen content is decreased, but this does not become a problem. Thus, it is seen from the results shown in Table 1 that the use of polacrylonitrile based activated carbon, for activated carbon electrodes, treated so that the nitrogen content is not more than 7 wt % provides an electric double layer capacitor whose electrostatic capacity is increased and stabilized and whose voltage retaining characteristic is superior.

In addition, in Table 1, the nitrogen content was measured by an elemental analyzer. Further, the voltage retaining characteristic was obtained by measuring the voltage across the terminals when left to stand at 25° C. under no load for 24 hours after it had been charged at 25° C. and 5 V for 15 minutes.

EXPERIMENTAL EXAMPLE 2

The nitrogen content of poly acrylonitrile based activated carbon can be adjusted by the degree of activation as well as by the conditions for heat treatment in a vacuum. That is, when the specific surface area increases as activation proceeds, the amount of nitrogen functional group tends to decrease. Activated carbon whose amount of nitrogen functional group was adjusted by the degree of activation was used for activated carbon electrodes in the same manner as in said experimental example 1, and electric double layer capacitors were produced. Their characteristics are shown in Table 2.

TABLE 2

|  | Specific surface area (m²/g) | Nitrogen content (%) | Electrostatic capacity (mF) | Voltage retaining characteristic (V) |
| --- | --- | --- | --- | --- |
| Comparative Example 2 | 700 | 10 | 55 | 3.0 |
| Embodiment 3 | 900 | 5 | 57 | 3.8 |
| Embodiment 4 | 1100 | 2 | 58 | 3.9 |

It will be understood from the results of this experiment that if polyacrylonitrile based activated carbon activated such that the nitrogen content is not more than 7 wt % is used for activated carbon electrodes (embodiments 3 and 4), it becomes possible to produce an electric double layer capacitor which has not only improved voltage retaining characteristic but also increased and stabilized electrostatic capacity.

In addition, the voltage retaining characteristic values in Table 2 are those values which were obtained by the same measuring method as in the voltage retaining characteristic values in Table 1.

What is claimed is:

1. An electric double layer capacitor, comprising:
   first and second polarizable electrodes,
   a separator disposed between said first and second polarizable electrodes, and
   first and second current collectors respectively in contact with said first and second polarizable electrodes, and
   each of said first and second polarizable electrodes comprising an activated carbon electrode made of polyacrylonitrile based activated carbon having a nitrogen content of not more than 7 wt % and electrolyte with which said activated carbon electrode is impregnated, said polyacrylonitrile based activated carbon being activated such that is has a greater affinity for said electrolyte without deterioration of voltage retaining characteristics of said electrodes.

2. An electric double layer capacitor as set forth in claim 1, wherein said polyacrylonitrile based activated carbon is obtained by subjecting polyacrylonitrile based fiber to flame resisting treatment and activating treatment.

3. An electric double layer capacitor as set forth in claim 2, wherein said flame resisting treatment comprises heat treating said polyacrylonitrile fiber in air at about 200° C. to about 400° C. and said activating treatment comprises activating polyacrylontrile fiber in a mixed gas of water vapor and nitrogen.

4. An electric double layer capacitor as set forth in claim 1, wherein said electrodes consist essentially of compacted, pulverized activating carbon.

* * * * *